(12) United States Patent
Kang

(10) Patent No.: US 9,110,335 B2
(45) Date of Patent: Aug. 18, 2015

(54) LIQUID CRYSTAL DISPLAY PANEL AND DISPLAY APPARATUS USING THE SAME

(75) Inventor: Chihtsung Kang, Shenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 0 days.

(21) Appl. No.: 13/522,959

(22) PCT Filed: May 28, 2012

(86) PCT No.: PCT/CN2012/076133
§ 371 (c)(1),
(2), (4) Date: Jul. 19, 2012

(87) PCT Pub. No.: WO2013/174022
PCT Pub. Date: Nov. 28, 2013

(65) Prior Publication Data
US 2015/0070623 A1    Mar. 12, 2015

(30) Foreign Application Priority Data

May 24, 2012 (CN) .......................... 2012 1 0163542

(51) Int. Cl.
| | |
|---|---|
| *G02F 1/13363* | (2006.01) |
| *G02F 1/1337* | (2006.01) |
| *G02F 1/1343* | (2006.01) |
| *G02F 1/139* | (2006.01) |
| *G02F 1/1335* | (2006.01) |

(52) U.S. Cl.
CPC .......... *G02F 1/13363* (2013.01); *G02F 1/1336* (2013.01); *G02F 1/1393* (2013.01); *G02F 1/133528* (2013.01); *G02F 1/133703* (2013.01); *G02F 1/134309* (2013.01); *G02F 1/134336* (2013.01); *G02F 2001/133531* (2013.01); *G02F 2001/133631* (2013.01); *G02F 2001/133638* (2013.01)

(58) Field of Classification Search
CPC ........ G02F 2001/133631; G02F 2001/133638; G02F 2001/133531; G02F 1/1336; G02F 1/133528; G02F 1/134309; G02F 1/133638; G02F 1/13363; G02F 1/133703; G02F 1/13436; G02F 1/1393
USPC .................................. 349/141, 129, 117, 102
See application file for complete search history.

(56) References Cited

U.S. PATENT DOCUMENTS

| | | | | |
|---|---|---|---|---|
| 5,929,955 | A  * | 7/1999 | Hsieh et al. ................... | 349/106 |
| 6,525,798 | B1 * | 2/2003 | Yamakita et al. ............. | 349/141 |
| 2011/0310335 | A1 * | 12/2011 | Hashimoto et al. ............ | 349/96 |

* cited by examiner

*Primary Examiner* — James Dudek
(74) *Attorney, Agent, or Firm* — Mark M Friedman

(57) ABSTRACT

The present invention provides a liquid crystal display (LCD) panel and a display apparatus using the same. In first pixel regions on a second substrate, there is a first predetermined angle between a trunk portion and branch portions. In second pixel regions, there is a second predetermined angle between the trunk portion and the branch portions. The first and second predetermined angles are different from each other. A half wave pattern retarder film is bonded to an outer surface of a first substrate or the second substrate. The present invention can improve the color shift problem and the transmittance of the LCD panel.

6 Claims, 8 Drawing Sheets

LIQUID CRYSTAL DISPLAY PANEL AND DISPLAY APPARATUS USING THE SAME

FIELD OF THE INVENTION

The present invention relates to a field of a liquid crystal display technology, and more particularly to a liquid crystal display (LCD) panel and a display apparatus using the same.

BACKGROUND OF THE INVENTION

Liquid crystal displays (LCDs) have been widely applied in electrical products. Currently, most of LCDs are backlight type LCDs which comprise a liquid crystal panel and a backlight module. The liquid crystal panel is composed of two transparent substrates and a liquid crystal sealed there-between.

At present, a vertical alignment (VA) technology has been developed for LCD panels. For example, a polymer stabilized vertical alignment (PSVA) type liquid crystal display panel which is made using a polymer-stabilized alignment (PSA) process, can have some advantages, such as wide viewing angle, high aperture ratio, high contrast and simple process.

In the PSVA type LCD, reactive monomers can be doped in the liquid crystal between the two transparent substrates and mixed with liquid crystal molecules, wherein the a polyimide (PI) is coated on the surface of each of the transparent substrates to be an alignment layer. Subsequently, when applying a voltage and irradiating an ultraviolet (UV) light to the two transparent substrates, a phase separation arises in the reactive monomers and the liquid crystal molecules, and a polymer is formed on the alignment layer of the transparent substrate. The liquid crystal molecules are oriented along a direction of the polymer due to the interaction between the polymer and the liquid crystal molecules. Therefore, the liquid crystal molecules between the transparent substrates can have a pre-tilt angle.

However, currently, a color shift problem is likely to occur in the VA type LCD, hence deteriorating the display quality of the LCD. For improving the above-mentioned color shift problem, a pixel structure of the LCD panel may be varied, but the variation of the pixel structure may result in a reduction of a transmittance of the LCD panel.

As a result, it is necessary to provide an LCD panel and a display apparatus using the same to solve the problems existing in the conventional technologies, as described above.

SUMMARY OF THE INVENTION

The present invention provides an LCD panel and a display apparatus using the same to solve the color shift problem and the transmittance problem of the VA type LCD.

A primary object of the present invention is to provide a liquid crystal display panel, and the liquid crystal display panel comprises: a first substrate comprising a first electrode; a second substrate comprising a second electrode, first pixel regions, second pixel regions and third pixel regions, wherein the second electrode has a pixel electrode structure, and the pixel electrode structure comprises a trunk portion and plurality of branch portions, and there is a first predetermined angle between the trunk portion and the branch portions in each of the first pixel regions, and there is a second predetermined angle between the trunk portion and the branch portions in each of the second pixel regions, and there is a third predetermined angle between the trunk portion and the branch portions in each of the third pixel regions, and the first predetermined angle and the second predetermined angle are less than or greater than 45 degrees, and the first predetermined angle, the second predetermined angle and the third predetermined angle are different from each other; a liquid crystal layer formed between the first substrate and the second substrate; a first polarizer disposed at an outer side of the first substrate; a second polarizer disposed at an outer side of the second substrate; and a half wave pattern retarder film bonded to an outer surface of the first substrate or the second substrate, wherein the half wave pattern retarder film comprises a plurality of first half wave retarder rows, a plurality of second half wave retarder rows and a plurality of third half wave retarder rows, and the first half wave retarder rows are positioned to the first pixel regions, and the second half wave retarder rows are positioned to the second pixel regions, and the third half wave retarder rows are positioned to the third half wave retarder rows.

In one embodiment of the present invention, the second substrate further comprises fourth pixel regions, and there is a fourth predetermined angle in the fourth pixel regions, and the fourth predetermined angle is different to the first predetermined angle, the second predetermined angle and the third predetermined angle.

In one embodiment of the present invention, the half wave pattern retarder film is positioned between the first substrate and the first polarizer.

In one embodiment of the present invention, the first predetermined angle, the second predetermined angle and the third predetermined angle are less than 45 degrees, and there is an angle ($\psi$) between a slow axis of the half wave pattern retarder film and an absorption axis of the first polarizer, and the first predetermined angle, the second predetermined angle or the third predetermined angle ($\theta$) and the angle ($\psi$) satisfy the following equation:

$$\psi + \theta = 45°.$$

In one embodiment of the present invention, the first predetermined angle, the second predetermined angle and the third predetermined angle are greater than 45 degrees, and there is an angle ($\psi$) between a slow axis of the half wave pattern retarder film and an absorption axis of the first polarizer, and the first predetermined angle, the second predetermined angle or the third predetermined angle ($\theta$) and the angle ($\psi$) satisfy the following equation:

$$\psi + \theta = 135°.$$

In one embodiment of the present invention, the half wave pattern retarder film is positioned between the second substrate and the second polarizer.

In one embodiment of the present invention, the first predetermined angle, the second predetermined angle and the third predetermined angle are less than 45 degrees, and there is an angle ($\psi$) between a slow axis of the half wave pattern retarder film and an absorption axis of the second polarizer, and the first predetermined angle, the second predetermined angle or the third predetermined angle ($\theta$) and the angle ($\psi$) satisfy the following equation:

$$\psi + \theta = 45°.$$

In one embodiment of the present invention, the first predetermined angle, the second predetermined angle and the third predetermined angle are greater than 45 degrees, and there is an angle ($\psi$) between a slow axis of the half wave pattern retarder film and an absorption axis of the second polarizer, and the first predetermined angle, the second predetermined angle or the third predetermined angle ($\theta$) and the angle ($\psi$) satisfy the following equation:

$$\theta - \psi = 45°.$$

Another object of the present invention is to provide a liquid crystal display panel, and the liquid crystal display panel comprises: a first substrate comprising a first electrode; a second substrate comprising a second electrode, first pixel regions, and second pixel regions, wherein the second electrode has a pixel electrode structure, and the pixel electrode structure comprises a trunk portion and plurality of branch portions, and there is a first predetermined angle between the trunk portion and the branch portions in each of the first pixel regions, and there is a second predetermined angle between the trunk portion and the branch portions in each of the second pixel regions, and the first predetermined angle and the second predetermined angle are less than or greater than 45 degrees, and the first predetermined angle is different from the second predetermined angle; a liquid crystal layer formed between the first substrate and the second substrate; a first polarizer disposed at an outer side of the first substrate; a second polarizer disposed at an outer side of the second substrate; and a half wave pattern retarder film bonded to an outer surface of the first substrate or the second substrate, wherein the half wave pattern retarder film comprises a plurality of first half wave retarder rows and a plurality of second half wave retarder rows, and the first half wave retarder rows are positioned to the first pixel regions, and the second half wave retarder rows are positioned to the second pixel regions.

In one embodiment of the present invention, the second substrate further comprises third pixel regions, and there is a third predetermined angle in the third pixel regions, and the third predetermined angle is different from the first predetermined angle and the second predetermined angle.

In one embodiment of the present invention, the second substrate further comprises fourth pixel regions, and there is a fourth predetermined angle in the fourth pixel regions, and the fourth predetermined angle is different to the first predetermined angle, the second predetermined angle and the third predetermined angle.

In one embodiment of the present invention, the half wave pattern retarder film is positioned between the first substrate and the first polarizer.

In one embodiment of the present invention, the first predetermined angle, the second predetermined angle and the third predetermined angle are less than 45 degrees, and there is an angle ($\psi$) between a slow axis of the half wave pattern retarder film and an absorption axis of the first polarizer, and the first predetermined angle, the second predetermined angle or the third predetermined angle ($\theta$) and the angle ($\psi$) satisfy the following equation:

$$\psi+\theta=45°.$$

In one embodiment of the present invention, the first predetermined angle, the second predetermined angle and the third predetermined angle are greater than 45 degrees, and there is an angle ($\psi$) between a slow axis of the half wave pattern retarder film and an absorption axis of the first polarizer, and the first predetermined angle, the second predetermined angle or the third predetermined angle ($\theta$) and the angle ($\psi$) satisfy the following equation:

$$\psi+\theta=135°.$$

In one embodiment of the present invention, the half wave pattern retarder film is positioned between the second substrate and the second polarizer.

In one embodiment of the present invention, the first predetermined angle, the second predetermined angle and the third predetermined angle are less than 45 degrees, and there is an angle ($\psi$) between a slow axis of the half wave pattern retarder film and an absorption axis of the second polarizer, and the first predetermined angle, the second predetermined angle or the third predetermined angle ($\theta$) and the angle ($\psi$) satisfy the following equation:

$$\psi+\theta=45°.$$

In one embodiment of the present invention, the first predetermined angle, the second predetermined angle and the third predetermined angle are greater than 45 degrees, and there is an angle ($\psi$) between a slow axis of the half wave pattern retarder film and an absorption axis of the second polarizer, and the first predetermined angle, the second predetermined angle or the third predetermined angle ($\theta$) and the angle ($\psi$) satisfy the following equation:

$$\theta-\psi=45°.$$

Still another object of the present invention is to provide a display apparatus, and the display apparatus display apparatus comprises: a backlight module; and a liquid crystal display panel comprising: a first substrate comprising a first electrode; a second substrate comprising a second electrode, first pixel regions, and second pixel regions, wherein the second electrode has a pixel electrode structure, and the pixel electrode structure comprises a trunk portion and plurality of branch portions, and there is a first predetermined angle between the trunk portion and the branch portions in each of the first pixel regions, and there is a second predetermined angle between the trunk portion and the branch portions in each of the second pixel regions, and the first predetermined angle and the second predetermined angle are less than or greater than 45 degrees, and the first predetermined angle is different from the second predetermined angle; a liquid crystal layer formed between the first substrate and the second substrate; a first polarizer disposed at an outer side of the first substrate; a second polarizer disposed at an outer side of the second substrate; and a half wave pattern retarder film bonded to an outer surface of the first substrate or the second substrate, wherein the half wave pattern retarder film comprises a plurality of first half wave retarder rows and a plurality of second half wave retarder rows, and the first half wave retarder rows are positioned to the first pixel regions, and the second half wave retarder rows are positioned to the second pixel regions.

In the LCD panel and the display apparatus using the same of the present invention, with the use of the pixel electrode structure, the color shift problem of the VA type LCD apparatus can be improved. For example, the pixel electrodes in the different pixel regions can have different predetermined angles (the angles between the trunk portion and the branch portions). Moreover, an angle between a tilting direction of the liquid crystal molecules and an absorption axis of the polarizer can be adjusted by the $\lambda/2$ retarder films for enhancing the transmittance of the liquid crystal display panel.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The following embodiments are referring to the accompanying drawings for exemplifying specific implementable embodiments of the present invention.

Figure 1:
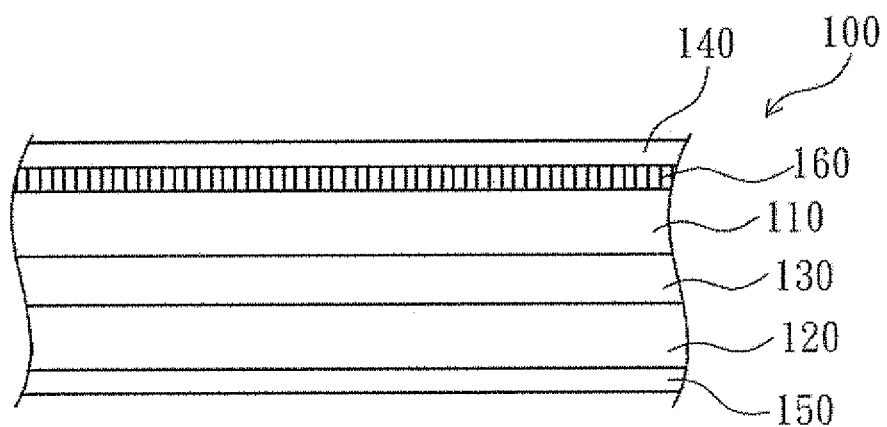
FIG. 1 is a cross-sectional view showing a liquid crystal display panel according to one embodiment of the present invention.

Referring to FIG. 1, a liquid crystal display panel 100 may comprise a first substrate 110, a second substrate 120, a liquid crystal layer 130, a first polarizer 140, a second polarizer 150 and a half wave (λ/2) pattern retarder film 160.

The liquid crystal layer 130 is formed between the first substrate 110 and the second substrate 120. That is, the liquid crystal layer 130 is positioned at inner sides of the first substrate 110 and the second substrate 120. The first polarizer 140 is disposed at an outer side of the first substrate 110, and the second polarizer 150 is disposed at an outer side of the second substrate 120. The λ/2 pattern retarder film 160 can be bonded to an outer surface of the first substrate 110 or the second substrate 120.

Referring to FIG. 1, the first substrate 110 and the second substrate 120 may be realized as glass substrates or flexible plastic substrates. The first substrate 110 may be a glass substrate or other material substrate with color filters (CF), and the second substrate 120 may be a glass substrate or other material substrate with a thin film transistor (TFT) array. It notes that the CF and the TFT array may also be disposed on the same substrate in other embodiments.

Figure 2:
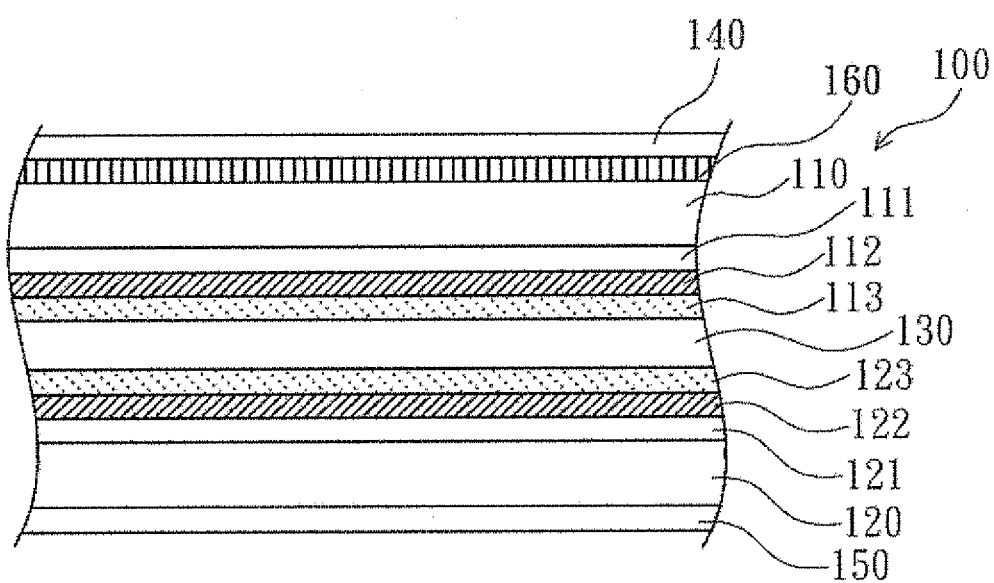
FIG. 2 is a cross-sectional view showing a PSVA type liquid crystal display panel according to one embodiment of the present invention.

Referring to FIG. 2, a cross-sectional view showing a PSVA type liquid crystal display panel according to one embodiment of the present invention is illustrated. In this embodiment, the liquid crystal display panel 100 may be, for example, a PSVA type liquid crystal display panel. At this time, the liquid crystal layer 130 can include reactive monomers and liquid crystal molecules. The reactive monomers are preferably photo-sensitive monomers mixed with the liquid crystal molecules. The first polarizer 140 is disposed on one side of the first substrate 110 and opposite to the liquid crystal layer 130 (i.e. a light-emitting side of the first substrate 110). The second polarizer 150 is disposed on one side of the second substrate 120 and opposite to the liquid crystal layer 130 (i.e. a light-incident side of the second substrate 120).

Referring to FIG. 2 again, when the liquid crystal display panel 100 is the PSVA type liquid crystal display panel, the first substrate 110 can comprise a first electrode 111, a first alignment layer 112 and a first polymer alignment layer 113, and the second substrate 120 can comprise a second electrode 121, a second alignment layer 122 and a second polymer alignment layer 123. The first alignment layer 112 and the first polymer alignment layer 113 are formed on the first electrode 111 in sequence. The second alignment layer 122 and the second polymer alignment layer 123 are formed on the second electrode 121 in sequence. The first electrode 111 and the second electrode 121 are preferably made of a transparent and electrically conductive material, such as ITO, IZO, AZO, GZO, TCO or ZnO. A voltage can be applied to the liquid crystal molecules of the liquid crystal layer 130 by the first electrode 111 and the second electrode 121. In this embodiment, the first electrode 111 may be a common electrode, and the second electrode 121 may be a pixel electrode. In addition, the second electrode 121 can have a plurality of regions, and the voltage applied to each of the regions may be the same or different. The alignment layers 112, 122 and the polymer alignment layers 113, 123 can have an alignment direction for determining the orientation of the liquid crystal molecules of the liquid crystal layer 130. The alignment layers 112, 122 and the polymer alignment layers 113, 123 can have a pre-tilt angle, wherein the pre-tilt angle is less than 90 degrees, preferably less than 60 degrees. The alignment layers 112, 122 are formed on the substrates 110, 120, respectively. The polymer alignment layers 113, 123 are polymerized of the reactive monomers bonded with the alignment layers 112, 122.

Figure 3:
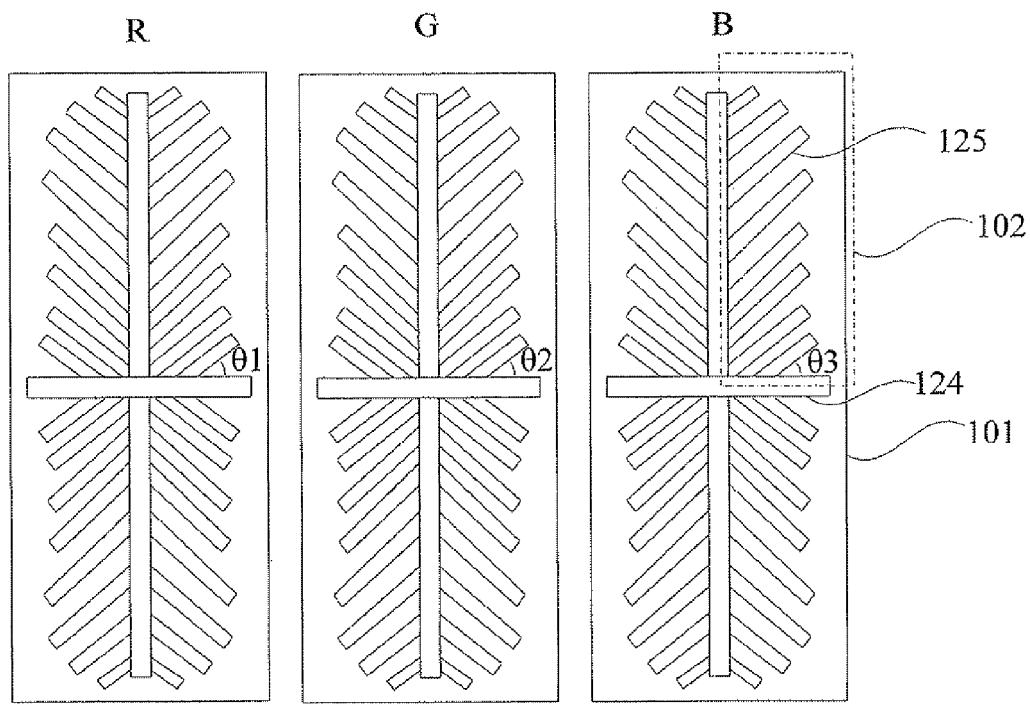
FIG. 3 is a schematic diagram showing a pixel region of the liquid crystal display panel according to one embodiment of the present invention.

Referring to FIG. 3, a schematic diagram showing pixel regions of the liquid crystal display panel according to one embodiment of the present invention is illustrated. The second substrate 120 comprises a plurality of signal lines (not shown), such as gate lines and data lines, which are crisscrossed, and thereby form a plurality of pixel regions 101 arranged in an array. Referring to FIG. 3 again, the pixel regions 101 comprise first pixel regions R, second pixel regions G and third pixel regions B. The pixel regions R, G, B may correspond to red, green and blue color filters. The second electrode 121 has a pixel electrode structure (or pixel pattern) for forming a multi-domain alignment. In this embodiment, the second electrode 121 in each of the pixel regions 101 comprises a trunk portion 124 and a plurality of branch portions 125. The trunk portion 124 may be a crisscross pattern, and each of the pixel regions 101 is divided into four sub-pixel regions 102 by the trunk portion 124. In each of the sub-pixel regions 102, the branch portions 125 obliquely extend from the trunk portion 124 and are arranged parallel to each other. In this case, there is a predetermined angle θ between the trunk portion 124 and the branch portions 125, and the predetermined angle θ is in the range of 0 to 90 degrees except 45 degrees. In each of the pixel regions 101, angles θ between the trunk portion 124 and the branch portions 125 may be all the same. In the embodiment shown in FIG. 3, the predetermined angle θ is less than 45 degrees.

For example, as shown in FIG. 3, there is a first predetermined angle θ1 in the first pixel regions R, and there is a second predetermined angle θ2 in the second pixel regions G, and there is a third predetermined angle θ3 in the third pixel regions B. The above-mentioned first predetermined angle θ1, second predetermined angle θ2 and third predetermined angle θ3 are less than or greater than 45 degrees, and the predetermined angles θ1, θ2, θ3 are different from each other. For example, as shown in FIG. 3, the first predetermined angle θ1 in the first pixel regions R may be of 41.5 degrees, and the second predetermined angle θ2 in the second pixel regions G may be of 42 degrees, and the third predetermined angle θ3 in the third pixel regions B may be of 42.5 degrees. With the use of different predetermined angles which are less than 45 degrees, the color shift problem exiting in the VA type LCD apparatus can be greatly improved.

In practice, the second substrate 120 may comprise four kinds of pixel regions 101, such as the first pixel regions R, the second pixel regions G, the third pixel regions B and fourth pixel regions Y (yellow). There is a fourth predetermined angle θ4 in the fourth pixel regions. The above-mentioned first predetermined angle θ1, second predetermined angle θ2, third predetermined angle θ3 and fourth predetermined angle θ4 are different from each other, and the similarities are not mentioned for simplification.

Figure 4:
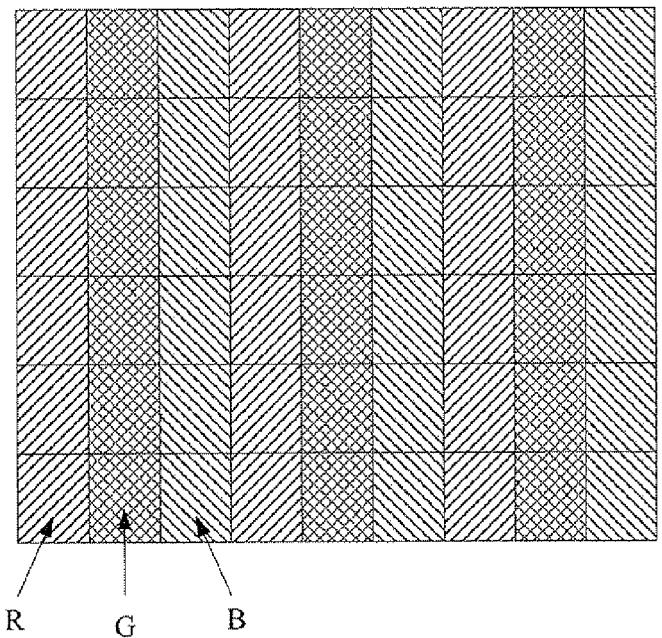
FIG. 4 is a schematic diagram showing the pixel regions of the liquid crystal display panel according to one embodiment of the present invention.
Figure 5:
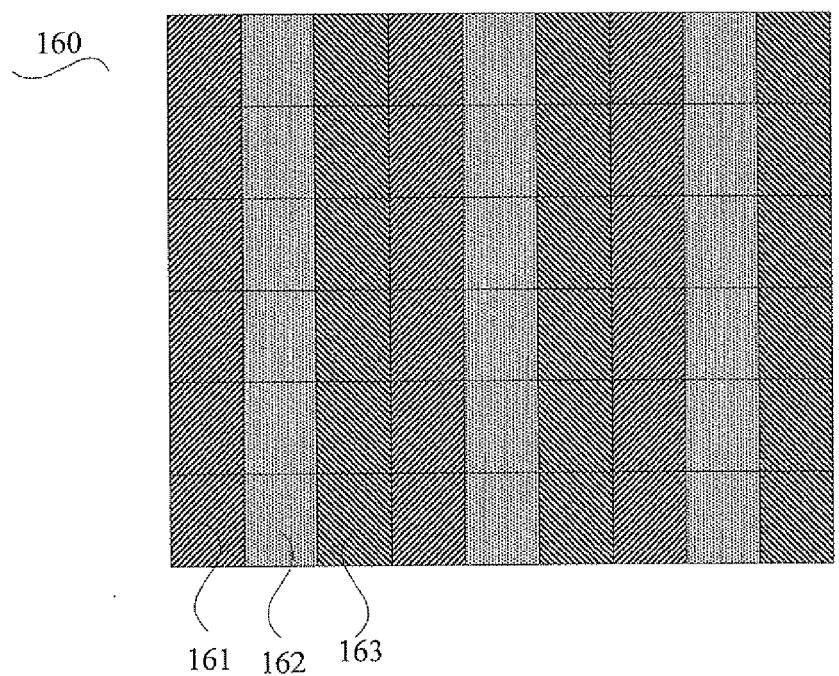
FIG. 5 is a schematic diagram showing a λ/2 pattern retarder film.

Referring to FIG. 4 and FIG. 5, FIG. 4 is a schematic diagram showing the pixel regions of the liquid crystal display panel according to one embodiment of the present invention, and FIG. 5 is a schematic diagram showing the λ/2 pattern retarder film 160. The λ/2 pattern retarder film 160 comprises a plurality of first λ/2 retarder rows 161, a plurality of second λ/2 retarder rows 162 and a plurality of third λ/2 retarder rows 163 arranged in an alternating manner. The first λ/2 retarder rows 161 are positioned to the first pixel regions R, and the second λ/2 retarder rows 162 are positioned to the second pixel regions G, and the third λ/2 retarder rows 163 are positioned to the third pixel regions B. There is an angle ψ1 between a slow axis (C axis) of the first λ/2 retarder rows 161 and an absorption axis of the polarizer 140 or 150, and there is an angle ψ2 between a slow axis of the second λ/2 retarder rows 162 and the absorption axis of the polarizer 140 or 150, and there is an angle ψ3 between a slow axis of the third λ/2 retarder rows 163 and the absorption axis of the polarizer 140 or 150.

According to an optical theory, when an angle between a tilting direction of the liquid crystal molecules and an absorption axis of the polarizer is 45 degrees, the liquid crystal display panel can have a greatest transmittance. Therefore, in embodiments of the present invention, the angle between the tilting direction of the liquid crystal molecules and an absorption axis of the polarizers 140, 150 is adjusted, so as to enhance the transmittance of the liquid crystal display panel 100.

In one embodiment, referring to FIG. 3, the predetermined angle θ (θ1, θ2, and θ3) between the trunk portion 124 and the branch portions 125 may be less than 45 degrees (θ<45°), such as in the range of 5 degrees to 42.5 degrees, for another example, in the range of 10 degrees to 40 degrees. At this time, the λ/2 pattern retarder film 160 can be bonded to the outer surface of the first substrate 110 or the second substrate 120 for adjusting polarized angles of the light rays.

Figure 6:
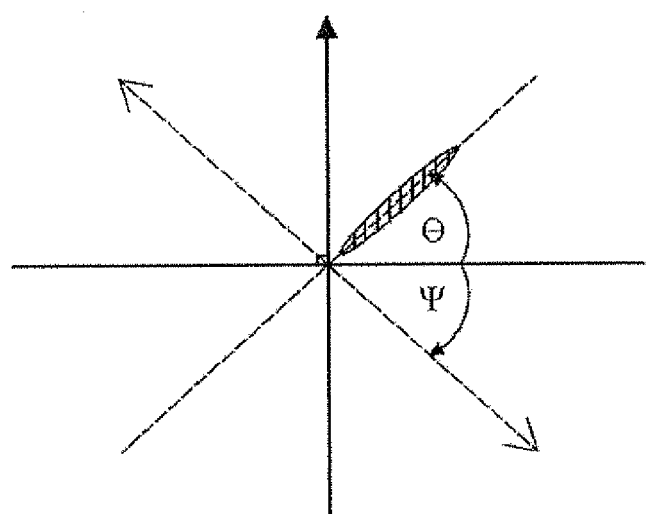
FIG. 6 is a schematic diagram showing different angles according to one embodiment of the present invention.

Referring to FIG. 2 and FIG. 6, FIG. 6 is a schematic diagram showing different angles according to one embodiment of the present invention. When the λ/2 pattern retarder film 160 is bonded to the outer surface of the first substrate 110, the λ/2 pattern retarder film 160 is positioned between the first substrate 110 and the first polarizer 140, and the absorption axis of the first polarizer 140 may be vertical to the absorption axis of the second polarizer 150. That is, an angle between the absorption axes of the first polarizer 140 and the second polarizer 150 is 90 degrees, and the predetermined angles θ (θ1, θ2, and θ3) is less than 45 degrees (θ<45°), and there are the angles ψ (ψ1, ψ2 and ψ3) between the slow axis (C axis) of the λ/2 retarder rows of the λ/2 pattern retarder film 160 and the absorption axis of the first polarizer 140. In this case, the predetermined angle θ (θ1, θ2 or θ3) and the angle ψ (ψ1, ψ2 or ψ3) satisfy the following equation (1):

$$\psi+\theta=45° \quad (1).$$

Figure 7A:
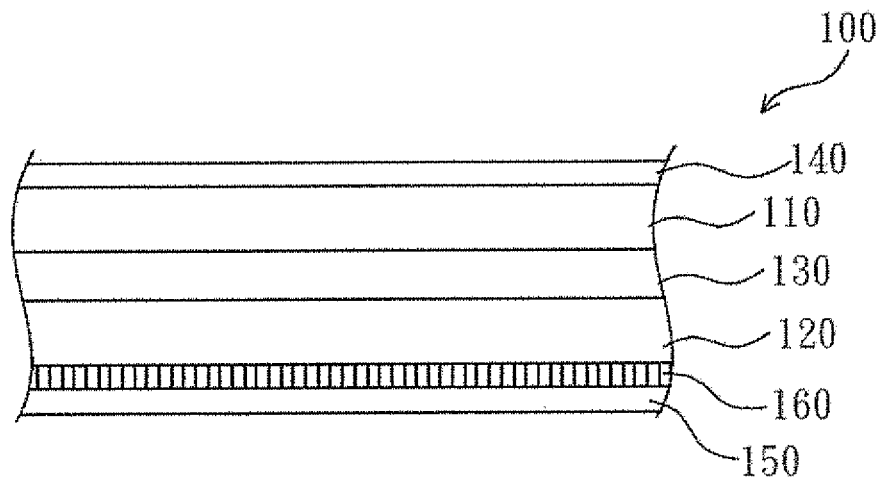
FIG. 7A is a cross-sectional view showing a liquid crystal display panel according to one embodiment of the present invention.
Figure 7B:
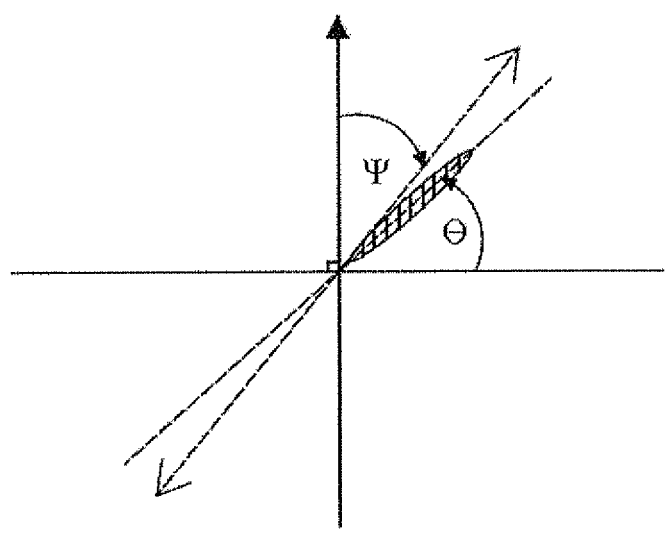
FIG. 7B is a schematic diagram showing different angles according to one embodiment of the present invention.

Referring to FIG. 7A and FIG. 7B, FIG. 7A is a cross-sectional view showing a liquid crystal display panel according to one embodiment of the present invention, and FIG. 7B is a schematic diagram showing different angles according to one embodiment of the present invention. When the λ/2 pattern retarder film 160 is bonded to the outer surface of the second substrate 120, the λ/2 pattern retarder film 160 is positioned between the second substrate 120 and the second polarizer 150, and the absorption axis of the first polarizer 140 may be vertical to the absorption axis of the second polarizer 150. That is, the angle between the absorption axes of the first polarizer 140 and the second polarizer 150 is 90 degrees, and the predetermined angles θ(θ1, θ2, and θ) is less than 45 degrees (θ<45°), and there are the angles ψ(ψ1, ψ2 and ψ3) between the slow axis of the λ/2 retarder rows of the λ/2 pattern retarder film 160 and the absorption axis of the second polarizer 150. In this case, the predetermined angle θ (θ1, θ2 or θ3) and the angle ψ (ψ1, ψ2 or ψ3) satisfy the following equation (2):

$$\psi+\theta=45° \quad (2).$$

Figure 8:
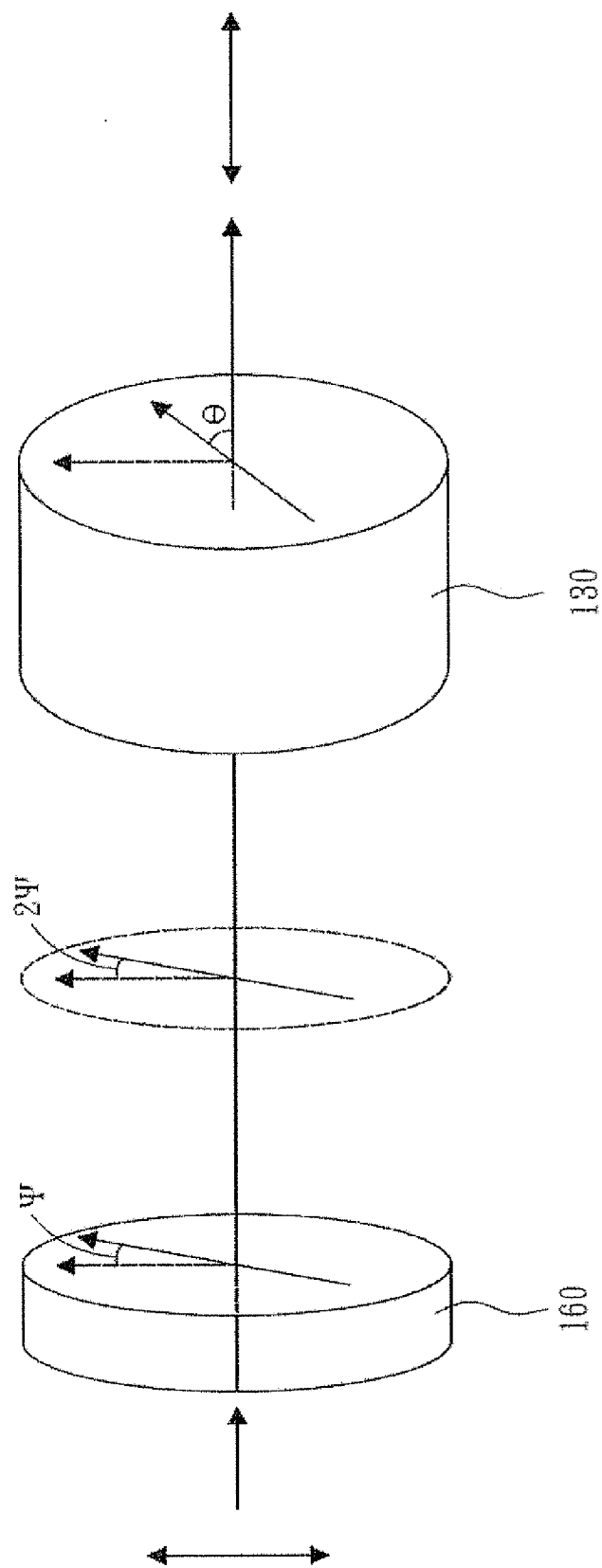
FIG. 8 is a schematic diagram showing polarized light rays according to one embodiment of the present invention.

Referring to FIG. 8, a schematic diagram showing polarized light rays according to one embodiment of the present invention is illustrated. Taking the liquid crystal display panel 100 shown in FIG. 7A for example, when the light rays are emitted from the second polarizer 150 to the first polarizer 140 of the liquid crystal display panel 100, vertically and linearly polarized light rays from the second polarizer 150 are transformed into another kind of linearly polarized light rays by the λ/2 pattern retarder film 160. There is an angle of 2ψ between the vertically and linearly polarized light rays and the transformed linearly polarized light rays. Subsequently, the transformed linearly polarized light rays are further transformed into horizontally and linearly polarized light rays by the liquid crystal layer 130 (i.e. a liquid crystal cell), so as to allow the light rays to pass a transmission axis of the first polarizer 140. At this time, the liquid crystal layer 130 can be equivalent to a λ/2 retarder film. Therefore, with the use of the λ/2 pattern retarder film 160, the polarized direction and angles of the light rays can be adjusted for enhancing the transmittance of the liquid crystal display panel 100.

Figure 9:
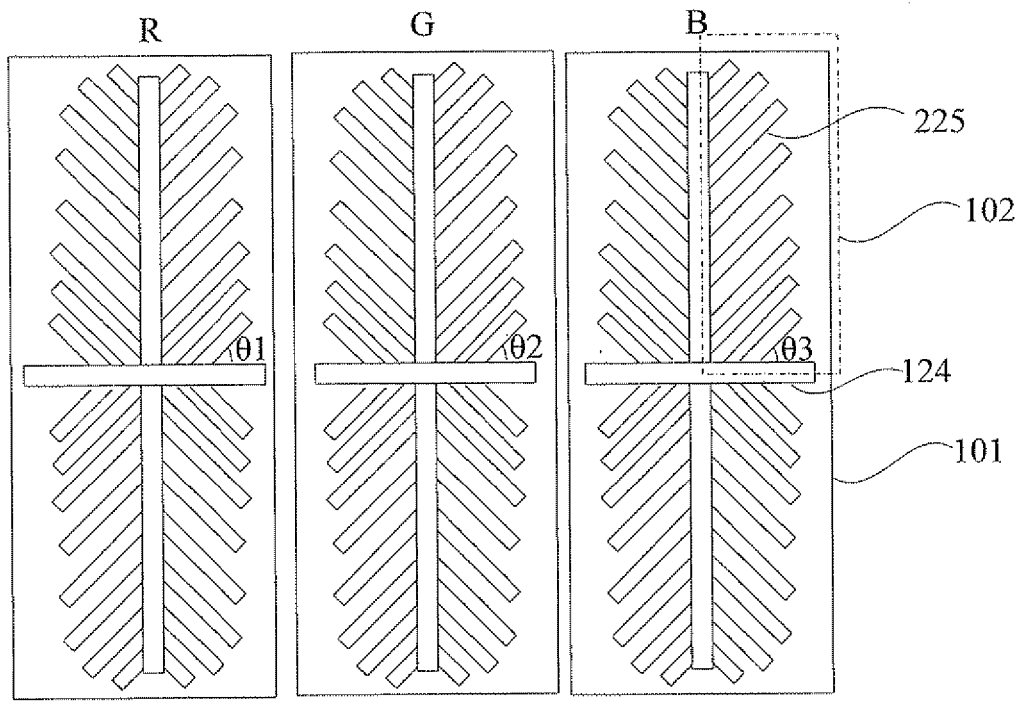
FIG. 9 is a schematic diagram showing a pixel electrode structure of a liquid crystal display panel according to another embodiment of the present invention.

Referring to FIG. 9, a schematic diagram showing a pixel electrode structure of a liquid crystal display panel according to another embodiment of the present invention is illustrated. In another embodiment, the predetermined angle θ between the trunk portion 124 and the branch portions 225 of the pixel electrode structure may be greater than 45 degrees (θ>45°). For example, as shown in FIG. 7, the first predetermined angle θ1 in the first pixel regions R may be of 48 degrees, and the second predetermined angle θ2 in the second pixel regions G may be of 48.5 degrees, and the third predetermined angle θ3 in the third pixel regions B may be of 49 degrees. At this time, the λ/2 pattern retarder film 260 can be bonded to the outer surface of the first substrate 110 or the second substrate 120 for adjusting polarized angles of the light rays.

Figure 10A:
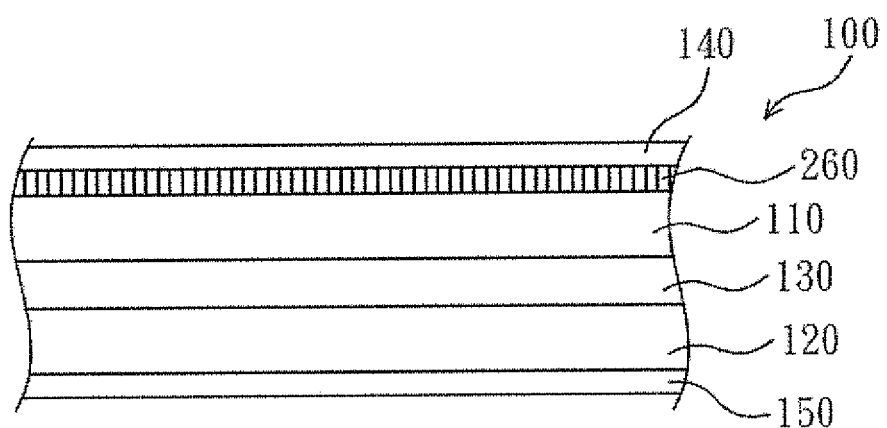
FIG. 10A is a cross-sectional view showing a liquid crystal display panel according to another embodiment of the present invention.
Figure 10B:
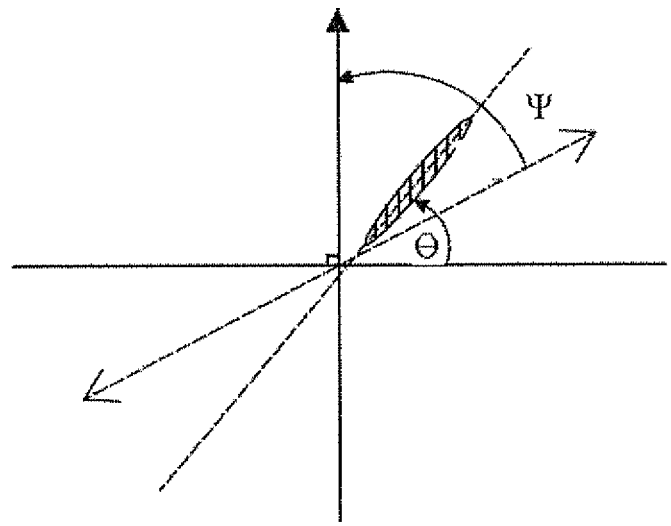
FIG. 10B is a schematic diagram showing different angles according to another embodiment of the present invention.

Referring to FIG. 10A and FIG. 10B, FIG. 10A is a cross-sectional view showing a liquid crystal display panel according to another embodiment of the present invention, and FIG. 10B is a schematic diagram showing different angles according to another embodiment of the present invention. When the λ/2 pattern retarder film 260 is bonded to the outer surface of the first substrate 110, the λ/2 pattern retarder film 260 is positioned between the first substrate 110 and the first polarizer 140, and the absorption axis of the first polarizer 140 may be vertical to the absorption axis of the second polarizer 150. That is, an angle between the absorption axes of the first polarizer 140 and the second polarizer 150 is 90 degrees, and the predetermined angles θ (θ1, θ2, and θ3) is greater than 45 degrees (θ>45°), and there are the angles ψ (ψ1, ψ2 and ψ3) between the slow axis (C axis) of the λ/2 retarder rows of the λ/2 pattern retarder film 260 and the absorption axis of the first polarizer 140. In this case, the predetermined angle θ (θ1, θ2 or θ3) and the angle ψ (ψ1, ψ2 or ψ3) satisfy the following equation (3):

$$\psi+\theta=135° \quad (3).$$

Figure 11A:
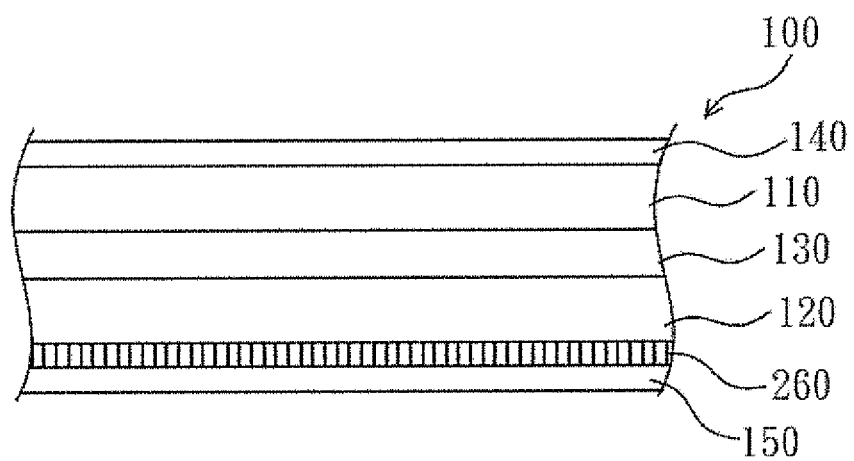
FIG. 11A is a cross-sectional view showing a liquid crystal display panel according to another embodiment of the present invention.
Figure 11B:
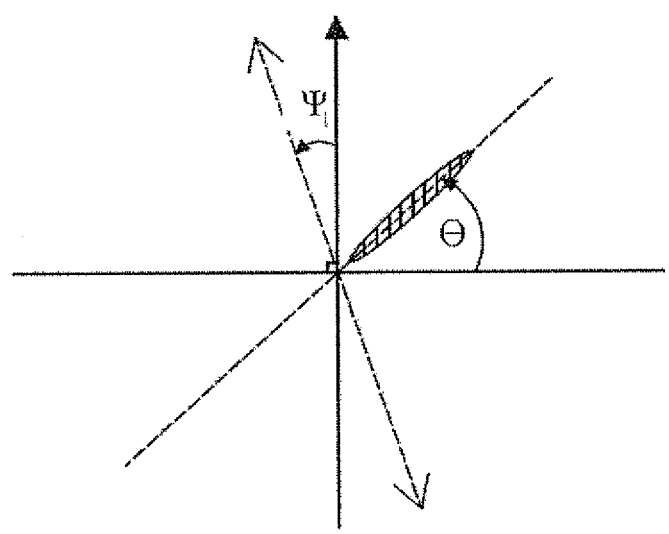
FIG. 11B is a schematic diagram showing different angles according to another embodiment of the present invention.

Referring to FIG. 11A and FIG. 11B, FIG. 11A is a cross-sectional view showing a liquid crystal display panel according to another embodiment of the present invention, and FIG. 11B is a schematic diagram showing different angles according to another embodiment of the present invention. When the λ/2 pattern retarder film 260 is bonded to the outer surface of the second substrate 120, the λ/2 pattern retarder film 260 is positioned between the second substrate 120 and the second polarizer 150, and the absorption axis of the first polarizer 140 may be vertical to the absorption axis of the second polarizer 150. That is, an angle between the absorption axes of the first polarizer 140 and the second polarizer 150 is 90 degrees, and the predetermined angles θ(θ1, θ2, and θ3) is greater than 45 degrees (θ>45°), and there are the angles ψ (ψ1, ψ2 and ψ3) between the slow axis (C axis) of the λ/2 retarder rows of the λ/2 pattern retarder film 260 and the absorption axis of the second polarizer 150. In this case, the predetermined angle θ (θ1, θ2 or θ3) and the angle ψ (ψ1, ψ2 or ψ3) satisfy the following equation (4):

$$\theta-=45° \quad (4).$$

In a further embodiment, the liquid crystal display panel may be, for example, a PVA type liquid crystal display panel. At this time, the polymer alignment layers may be omitted in the liquid crystal display panel.

The present invention further provides a display apparatus. The display apparatus comprises the liquid crystal display panel provided by the present invention, and the liquid crystal display panel has been described above and not mentioned here for simplification.

As described above, in the LCD panel and the display apparatus of the present invention using the same, with the use of the pixel electrode structure, the color shift problem of the VA type LCD apparatus can be improved. For example, the pixel electrodes in the different pixel regions can have different predetermined angles (the angles between the trunk portion and the branch portions). Moreover, the angle between the tilting direction of the liquid crystal molecules and the absorption axis of the polarizer for enhancing the transmittance of the liquid crystal display panel. Therefore, in the LCD panel and the display apparatus of the present invention using the same, the color shift problem of the LCD panel can be improved, and the transmittance thereof can be enhanced.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A liquid crystal display panel comprising:
a first substrate comprising a first electrode;
a second substrate comprising a second electrode, first pixel regions, second pixel regions and third pixel regions, wherein the second electrode has a pixel electrode structure, and the pixel electrode structure comprises a trunk portion and plurality of branch portions, and there is a first predetermined angle between the trunk portion and the branch portions in each of the first pixel regions, and there is a second predetermined angle between the trunk portion and the branch portions in each of the second pixel regions, and there is a third predetermined angle between the trunk portion and the branch portions in each of the third pixel regions, and the first predetermined angle and the second predetermined angle are less than or greater than 45 degrees, and the first predetermined angle, the second predetermined angle and the third predetermined angle are different from each other;
a liquid crystal layer formed between the first substrate and the second substrate;
a first polarizer disposed at an outer side of the first substrate;
a second polarizer disposed at an outer side of the second substrate; and
a half wave pattern retarder film bonded to an outer surface of the first substrate or the second substrate, wherein the half wave pattern retarder film comprises a plurality of first half wave retarder rows, a plurality of second half wave retarder rows and a plurality of third half wave retarder rows, and the first half wave retarder rows are positioned to the first pixel regions, and the second half wave retarder rows are positioned to the second pixel regions, and the third half wave retarder rows are positioned to the third half wave retarder rows;
wherein the half wave pattern retarder film is positioned between the first substrate and the first polarizer;
wherein, when the first predetermined angle, the second predetermined angle and the third predetermined angle are less than 45 degrees, and there is an angle (ψ) between a slow axis of the half wave pattern retarder film and an absorption axis of the first polarizer, and the first predetermined angle, the second predetermined angle or the third predetermined angle (θ) and the angle (ψ) satisfy the following equation:

$$\psi+\theta=45;$$

Wherein, when the first predetermined angle, the second predetermined angle and the third predetermined angle are greater than 45 degrees, and there is an angle (ψ) between a slow axis of the half wave pattern retarder film and an absorption axis of the first polarizer, and the first predetermined angle, the second predetermined angle or the third predetermined angle θ and the angle (ψ) satisfy the following equation:

$$\psi+\theta=135°.$$

2. The liquid crystal display panel according to claim 1, wherein the second substrate further comprises fourth pixel regions, and there is a fourth predetermined angle in the fourth pixel regions, and the fourth predetermined angle is different to the first predetermined angle, the second predetermined angle and the third predetermined angle.

3. A liquid crystal display panel comprising:

a first substrate comprising a first electrode;

a second substrate comprising a second electrode, first pixel regions, and second pixel regions, wherein the second electrode has a pixel electrode structure, and the pixel electrode structure comprises a trunk portion and plurality of branch portions, and there is a first predetermined angle between the trunk portion and the branch portions in each of the first pixel regions, and there is a second predetermined angle between the trunk portion and the branch portions in each of the second pixel regions, and the first predetermined angle and the second predetermined angle are less than or greater than 45 degrees, and the first predetermined angle is different from the second predetermined angle;

a liquid crystal layer formed between the first substrate and the second substrate;

a first polarizer disposed at an outer side of the first substrate;

a second polarizer disposed at an outer side of the second substrate; and a half wave pattern retarder film bonded to an outer surface of the first substrate or the second substrate, wherein the half wave pattern retarder film comprises a plurality of first half wave retarder rows and a plurality of second half wave retarder rows, and the first half wave retarder rows are positioned to the first pixel regions, and the second half wave retarder rows are positioned to the second pixel regions wherein the half wave pattern retarder film is positioned between the first substrate and the first polarizer;

wherein, when the first predetermined angle, the second predetermined angle and the third predetermined angle are less than 45 degrees, and there is an angle ($\psi$) between a slow axis of the half wave pattern retarder film and an absorption axis of the first polarizer, and the first predetermined angle, the second predetermined angle or the third predetermined angle ($\theta$) and the angle ($\psi$) satisfy the following equation:

$\psi+\theta=45$;

Wherein, when the first predetermined angle, the second predetermined angle and the third predetermined angle are greater than 45 degrees, and there is an angle ($\psi$) between a slow axis of the half wave pattern retarder film and an absorption axis of the first polarizer, and the first predetermined angle, the second predetermined angle or the third predetermined angle ($\theta$) and the angle ($\psi$) satisfy the following equation:

$\psi+\theta=135°$.

4. The liquid crystal display panel according to claim 3, wherein the second substrate further comprises third pixel regions, and there is a third predetermined angle in the third pixel regions, and the third predetermined angle is different from the first predetermined angle and the second predetermined angle.

5. The liquid crystal display panel according to claim 4, wherein the second substrate further comprises fourth pixel regions, and there is a fourth predetermined angle in the fourth pixel regions, and the fourth predetermined angle is different to the first predetermined angle, the second predetermined angle and the third predetermined angle.

6. A display apparatus comprising:

a backlight module; and a liquid crystal display panel comprising:

a first substrate comprising a first electrode;

a second substrate comprising a second electrode, first pixel regions, and second pixel regions, wherein the second electrode has a pixel electrode structure, and the pixel electrode structure comprises a trunk portion and plurality of branch portions, and there is a first predetermined angle between the trunk portion and the branch portions in each of the first pixel regions, and there is a second predetermined angle between the trunk portion and the branch portions in each of the second pixel regions, and the first predetermined angle and the second predetermined angle are less than or greater than 45 degrees, and the first predetermined angle is different from the second predetermined angle;

a liquid crystal layer formed between the first substrate and the second substrate;

a first polarizer disposed at an outer side of the first substrate;

a second polarizer disposed at an outer side of the second substrate; and a half wave pattern retarder film bonded to an outer surface of the first substrate or the second substrate, wherein the half wave pattern retarder film comprises a plurality of first half wave retarder rows and a plurality of second half wave retarder rows, and the first half wave retarder rows are positioned to the first pixel regions, and the second half wave retarder rows are positioned to the second pixel regions;

wherein the half wave pattern retarder film is positioned between the first substrate and the first polarizer;

wherein, when the first predetermined angle, the second predetermined angle and the third predetermined angle are less than 45 degrees, and there is an angle ($\psi$) between a slow axis of the half wave pattern retarder film and an absorption axis of the first polarizer, and the first predetermined angle, the second predetermined angle or the third predetermined angle ($\theta$) and the angle ($\psi$) satisfy the following equation;

$\psi+\theta=45$;

Wherein, when the first predetermined angle, the second predetermined angle and the third predetermined angle are greater than 45 degrees, and there is an angle ($\psi$) between a slow axis of the half wave pattern retarder film and an absorption axis of the first polarizer and the first predetermined angle, the second predetermined angle or the third predetermined angle ($\theta$) and the angle ($\psi$) satisfy the following equation:

$\psi+\theta=135°$.

* * * * *